US012630061B2

(12) United States Patent
Lin et al.

(10) Patent No.:  US 12,630,061 B2
(45) Date of Patent:  May 19, 2026

(54) SAFETY SEAT BASE AND SAFETY SEAT

(71) Applicants: Jiangjuan Lin, Ningbo (CN); Huanle Xia, Ningbo (CN)

(72) Inventors: Jiangjuan Lin, Ningbo (CN); Huanle Xia, Ningbo (CN)

(73) Assignee: NINGBO WELLDON INFANT AND CHILD SAFETY TECHNOLOGY CO., LTD., Ningbo (CN)

( * ) Notice: Subject to any disclaimer, the term of this patent is extended or adjusted under 35 U.S.C. 154(b) by 138 days.

(21) Appl. No.: 18/813,071

(22) Filed: Aug. 23, 2024

(65) Prior Publication Data

US 2024/0409011 A1      Dec. 12, 2024

(30) Foreign Application Priority Data

Jan. 5, 2024    (CN) .......................... 202420029196.6
Jan. 14, 2024    (CN) .......................... 202420083281.0

(51) Int. Cl.
*B60N 2/28*              (2006.01)
(52) U.S. Cl.
CPC ................................. *B60N 2/2821* (2013.01)
(58) Field of Classification Search
CPC .. B60N 2/2869; B60N 2/2821; B60N 2/2824; B60N 2/2827; B60N 2/143; B60N 2/146; B60N 2/28; B60N 2/2812; B60N 2/2806; A47C 4/02; A47C 3/00; A47D 1/03; A47D 1/002

USPC .............. 297/256.16, 256.12, 250.1, 256.14, 297/440.22
See application file for complete search history.

(56) References Cited

U.S. PATENT DOCUMENTS

| | | | | |
|---|---|---|---|---|
| 7,073,859 | B1 * | 7/2006 | Wilson ................. | B60N 2/2863 297/256.13 |
| 11,878,609 | B2 * | 1/2024 | Williams ............. | B60N 2/2845 |
| 12,311,814 | B2 * | 5/2025 | Williams ............. | B60N 2/2824 |
| 12,454,206 | B2 * | 10/2025 | Son .................... | B60N 2/02246 |
| 2006/0170262 | A1 * | 8/2006 | Gold .................... | B60N 2/2875 297/256.12 |

* cited by examiner

*Primary Examiner* — Adam J Waggenspack

(57) ABSTRACT

The present invention provides a safety seat base. The safety seat base includes a base shell and a bracket assembly. The base shell is provided with an annular guide rail. The bracket assembly includes at least two bracket main bodies and several reinforcing members. Clamping portions are arranged at lower parts of two ends of the bracket main bodies. The reinforcing members are connected to positions, close to the clamping portions, at end portions of the bracket main bodies. Sliding chutes are formed between surfaces of the reinforcing members and surfaces of the clamping portions. The sliding chutes allow the annular guide rail to be inserted and slide along the annular guide rail. The present invention further provides a safety seat. The safety seat includes a safety seat base, a base shell, a bracket assembly and a seat.

20 Claims, 17 Drawing Sheets

SAFETY SEAT BASE AND SAFETY SEAT

CROSS-REFERENCE TO RELATED APPLICATIONS

The application claims priority of Chinese patent application CN2024200291966, filed on Jan. 5, 2024, and Chinese Patent Application No. CN2024200832810, filed on Jan. 14, 2024, the entire contents of which are incorporated herein by reference.

TECHNICAL FIELD

The present disclosure relates to the technical field of safety seats, and in particular, to a safety seat base and a safety seat.

BACKGROUND

A child safety seat, also referred to as a child restraint system, is a seat that is designed specially for children in different ages (or having different weights). The child safety seat is mounted in a vehicle, and can effectively improve the safety of a child sitting in the vehicle. The European regulation ECE R129 defines a child safety seat as a child safety protection system that can be fixed on a motor vehicle and is composed of a safety belt assembly or a flexible component, an adjustment mechanism, an accessory, and the like. The child safety seat can be combined with an additional device such as a portable child bed, a baby cradle, an auxiliary seat, or a collision protection device. In the event of a collision or sudden deceleration of the vehicle, the child safety seat can relieve the impact on children and restrict the body movement of the children to reduce the injury, to ensure the safety of children sitting in the vehicle. The child safety seat is widely used.

To meet the safety needs of children in different age groups, many existing child safety seats can be rotated for adjustment. A seat body of the child safety seat can be rotated 360 degrees relative to a base. The existing product is usually provided with a base shell; the base shell is provided with a sliding rail; a sliding chute is provided on a rotating assembly; and the sliding rail is inserted into the sliding chute to achieve rotational connection between the rotating assembly and the base shell. However, this product has certain problems. To use the product, the sliding chute is subjected to high force, which can easily cause deformation or breakage. The product is not safe to use, and the assembling efficiency is low. Meanwhile, a locking structure of the existing product is usually arranged on the base. When the seat is mounted, the locking structure is easily damaged and can easily pinch the fingers of a user, resulting in a poor user experience.

Therefore, the present disclosure provides a safety seat base and a safety seat, which can effectively solve the above problems. The safety seat base and the safety seat are simple in structure, firm, durable, and long in service life.

SUMMARY

In order to overcome the shortcomings of the prior art, the present disclosure provides a safety seat base and a safety seat. The safety seat base and the safety seat are simple in structure, firm, durable, and long in service life.

The technical solution adopted by the present disclosure to solve the technical problem is as follows.

The present disclosure provides a safety seat base, includes:

a base shell, wherein the base shell is provided with an annular guide rail; and a bracket assembly, wherein the bracket assembly includes at least two bracket main bodies and several reinforcing members; clamping portions are arranged at lower parts of two ends of the bracket main bodies; the reinforcing members are connected to positions, close to the clamping portions, at end portions of the bracket main bodies; sliding chutes are formed between surfaces of the reinforcing members and surfaces of the clamping portions; and the sliding chutes allow the annular guide rail to be inserted and slide along the annular guide rail.

As an improvement of the present disclosure, each reinforcing member is provided with a first contact portion and a second contact portion; the second contact portion extends along a surface of the first contact portion towards each clamping portion; the first contact portion is in contact with a lower surface of the annular guide rail; and the second contact portion is in contact with an inner surface of the annular guide rail.

As an improvement of the present disclosure, the bracket assembly further includes several locking rods; the locking rods extend along upper parts of the two ends of the bracket main bodies to two sides; and the locking rods are configured to be connected to a locking assembly on a seat.

As an improvement of the present disclosure, the bracket assembly further includes a pressure-bearing member; the pressure-bearing member is connected to the bracket main bodies and/or the locking rods; and a lower surface of the pressure-bearing member is in contact with an upper surface of the annular guide rail.

As an improvement of the present disclosure, the bracket assembly further includes a cover plate; and the cover plate is connected to the bracket main bodies, the pressure-bearing member, and the locking rods, and covers the annular guide rail.

As an improvement of the present disclosure, an accommodating slot is provided on a lower surface of the cover plate; and the bracket main bodies are inserted into the accommodating slot and resist against an inner wall of the accommodating slot.

As an improvement of the present disclosure, the bracket assembly further includes a bracket connector; the bracket connector is connected to the various bracket main bodies; and the bracket connector resists against the lower surface of the cover plate.

The present disclosure further provides a safety seat, includes:

a safety seat base, wherein the safety seat base includes:

a base shell, wherein the base shell is provided with an annular guide rail; and a bracket assembly, wherein the bracket assembly includes at least two bracket main bodies and several reinforcing members; clamping portions are arranged at lower parts of two ends of the bracket main bodies; the reinforcing members are connected to positions, close to the clamping portions, at end portions of the bracket main bodies; sliding chutes are formed between surfaces of the reinforcing members and surfaces of the clamping portions; the sliding chutes allow the annular guide rail to be inserted and slide along the annular guide rail; and a seat, wherein the seat is provided with a locking assembly, and the locking assembly is detachably connected to the bracket assembly.

As an improvement of the present disclosure, each reinforcing member is provided with a first contact portion and a second contact portion; the second contact portion extends along a surface of the first contact portion towards each clamping portion; the first contact portion is in contact with a lower surface of the annular guide rail; and the second contact portion is in contact with an inner surface of the annular guide rail.

As an improvement of the present disclosure, the bracket assembly further includes several locking rods; the locking rods extend along upper parts of the two ends of the bracket main bodies to two sides; and the locking rods are detachably connected to the locking assembly.

As an improvement of the present disclosure, the bracket assembly further includes a pressure-bearing member; the pressure-bearing member is connected to the bracket main bodies and/or the locking rods; and a lower surface of the pressure-bearing member is in contact with an upper surface of the annular guide rail.

As an improvement of the present disclosure, the bracket assembly further includes a cover plate; and the cover plate is connected to the bracket main bodies, the pressure-bearing member, and the locking rods, and covers the annular guide rail.

As an improvement of the present disclosure, an accommodating slot is provided on a lower surface of the cover plate; and the bracket main bodies are inserted into the accommodating slot and resist against an inner wall of the accommodating slot.

As an improvement of the present disclosure, the bracket assembly further includes a bracket connector; the bracket connector is connected to the various bracket main bodies; and the bracket connector resists against the lower surface of the cover plate.

As an improvement of the present disclosure, the locking assembly includes a locking connector and a clamping member; the locking connector is connected to the seat; the clamping member is connected to the locking connector through a rotating shaft and rotates between a locking position and a releasing position; the clamping member is provided with a locking slot; when the clamping member rotates to the locking position, the locking rods are clamped into the locking slot; and when the clamping member rotates to the releasing position, the locking rods are detached from the locking slot.

As an improvement of the present disclosure, the locking assembly further includes a limiting shaft and a limiting member; the clamping member is provided with a resisting portion; the limiting member moves relative to the locking connector between a first position and a second position; when the limiting member moves to the first position, the limiting shaft resists against the resisting portion to hinder the rotation of the clamping member; and when the limiting member moves to the second position, the limiting member drives the limiting shaft to be detached from the resisting portion, to allow the clamping member to rotate.

As an improvement of the present disclosure, the limiting member is provided with a first waist hole arranged horizontally and a second waist hole arranged obliquely; a third waist hole arranged vertically is provided on the locking connector; the rotating shaft is inserted into the first waist hole; and the limiting member is inserted into the second waist hole and the third waist hole.

As an improvement of the present disclosure, the locking assembly further includes a first elastic member; two ends of the first elastic member are respectively connected to the clamping member and the seat; and elastic potential energy of the first elastic member enables the clamping member to have a trend to move towards the releasing position.

As an improvement of the present disclosure, the locking assembly further includes a second elastic member; two ends of the second elastic member are respectively connected to the limiting member and the seat; and elastic potential energy of the second elastic member enables the limiting member to have a trend to move towards the first position.

As an improvement of the present disclosure, the locking assembly further includes a traction member; and the traction member is connected to the limiting member and drives the limiting member to move towards the second position under the action of external force.

As an improvement of the present disclosure, the traction member is a traction rope. The locking connector is provided with a traction rope pressing block. A limiting channel is formed between the traction rope pressing block and the locking connector, and the traction rope passes through the limiting channel.

Beneficial effects: By the arrangement of the above structure, the sliding chutes are formed between the surfaces of the reinforcing member and the surfaces of the clamping portions, and the annular guide rail is inserted into the sliding chutes, so that the bracket assembly can rotate relative to the base shell. During use, a user can connect the safety seat to the bracket assembly and adjust the orientation of the safety seat, which is convenient for use. In the traditional product, the sliding chutes are usually directly provided on the bracket main bodies, but the bracket main bodies of this product has low strength and are easily broken. The processing difficulty increases, and the production efficiency is low. Adding the reinforcing members can improve the strength of the sliding chutes. The sliding chutes are formed between the surfaces of reinforcing members and the surfaces of the clamping portions, which can further reduce the production difficulty of the bracket main bodies, improve the production efficiency, reduce the mounting difficulty, and improve the assembling efficiency. Preferably, each reinforcing member includes a reinforcing connector a and a friction sleeve b. The reinforcing connector a is connected to the bracket main body by a bolt, and the friction sleeve b sleeves a surface of the reinforcing connector a. The bracket main body and the reinforcing connector a are usually made of a metal material to improve the strength of the product. The friction sleeve b is usually made of a plastic material, which can effectively reduce wear and friction. Meanwhile, the plastic can have a deformation, so that the bracket assembly slides more smoothly relative to the annular guide rail. Since the safety seat is generally arranged in an automobile, a child sitting in the seat may fall over forwards or backwards due to the inertia during acceleration and braking of the automobile. In this case, the bracket assembly will be subjected to an obliquely upwards drag force. The reinforcing members are arranged at front ends and rear ends of the bracket main bodies. The reinforcing members resist against a lower surface of the annular guide rail, which can improve the structural strength and stability of this position. Preferably, the reinforcing members are arranged on outer sides of the bracket main bodies, so that the bracket main bodies are located between the two outermost reinforcing members, which can better balance the force and maintain the stability and balance of the product.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

6

DETAILED DESCRIPTION OF THE EMBODIMENTS

Figure 1:
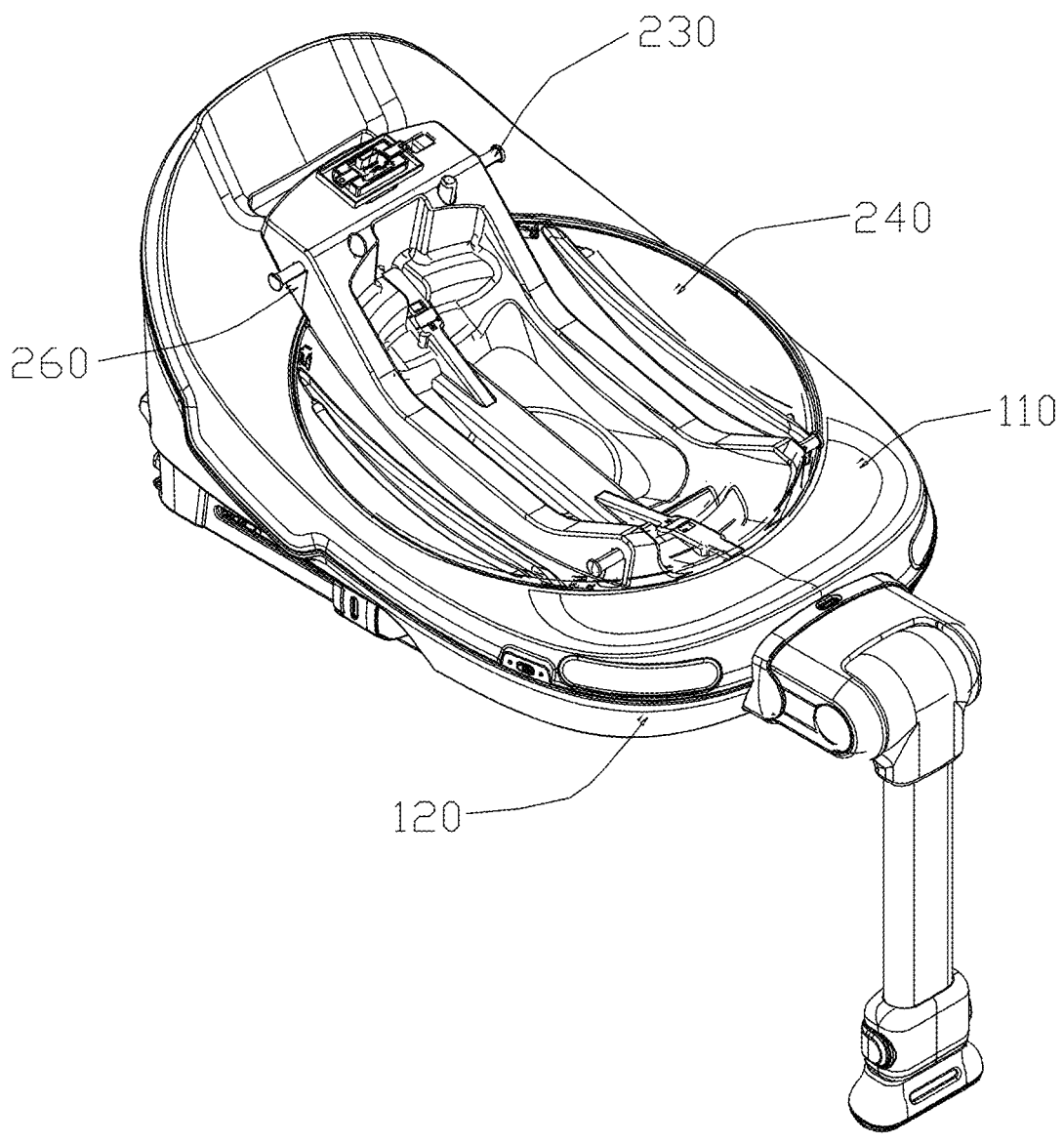
FIG. 1 is a schematic diagram of an entire structure of a base according to the present disclosure.
Figure 2:
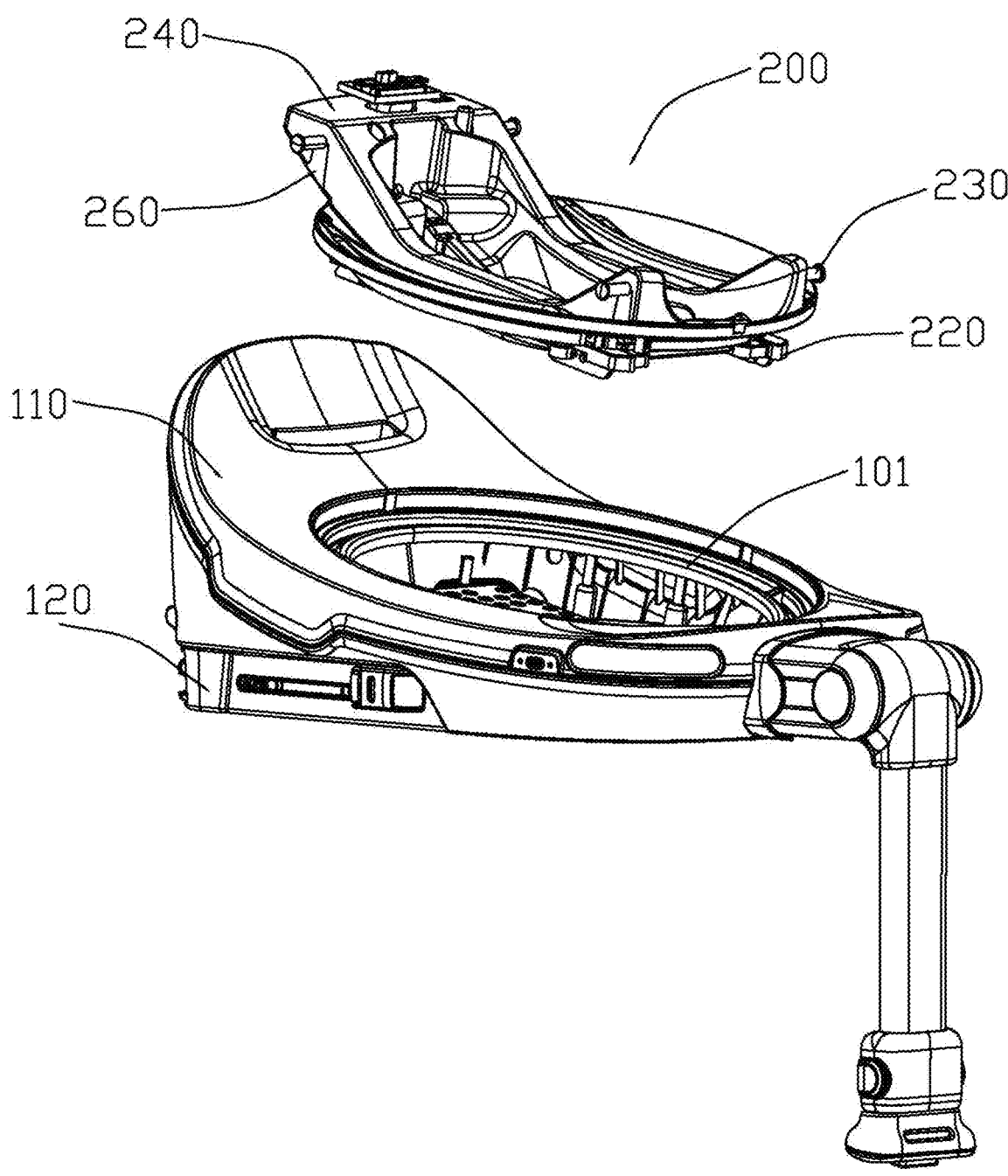
FIG. 2 is a structural exploded diagram of a base according to the present disclosure.
Figure 3:
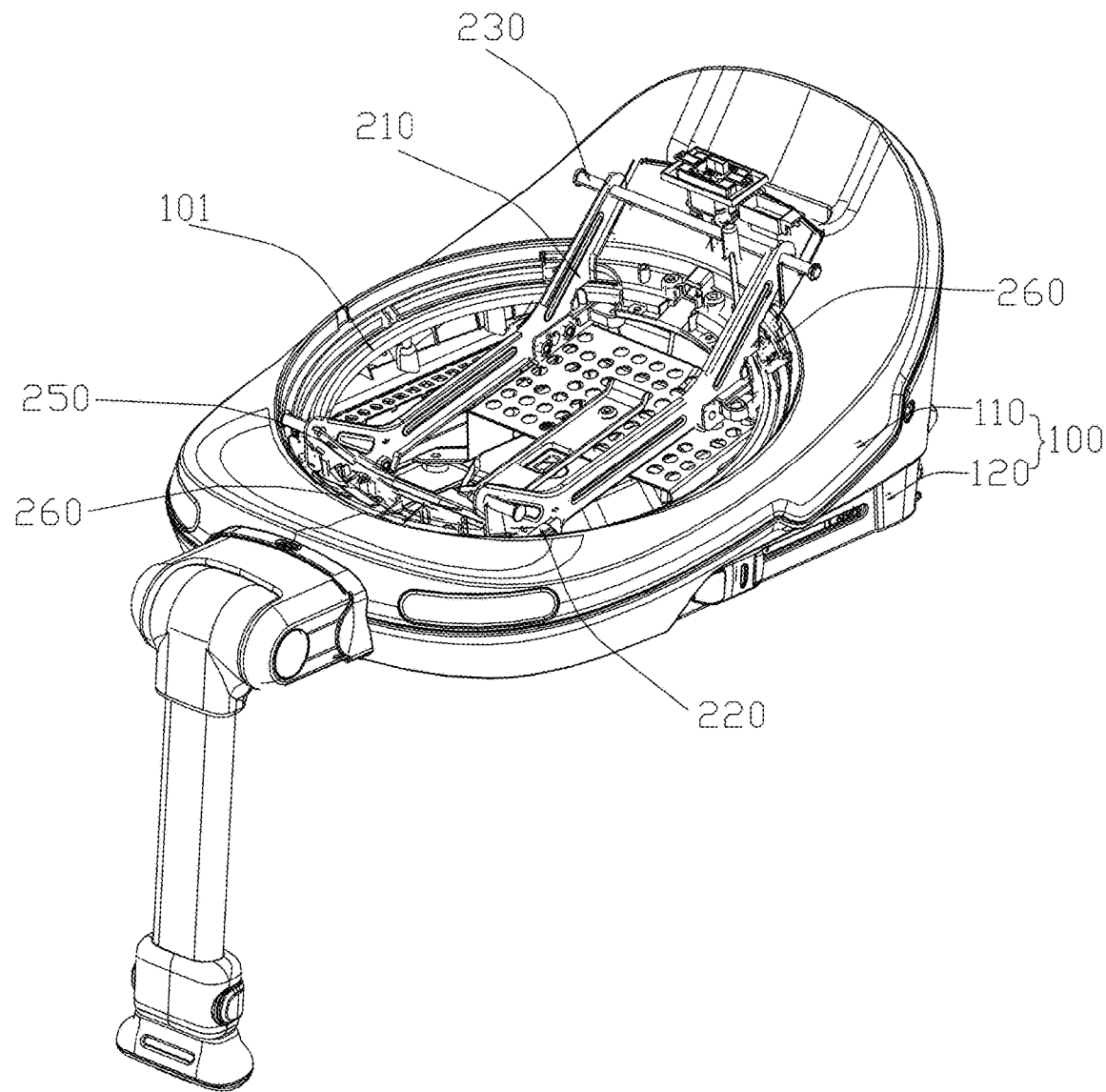
FIG. 3 is a schematic partially structural diagram of a base according to the present disclosure.
Figure 4:
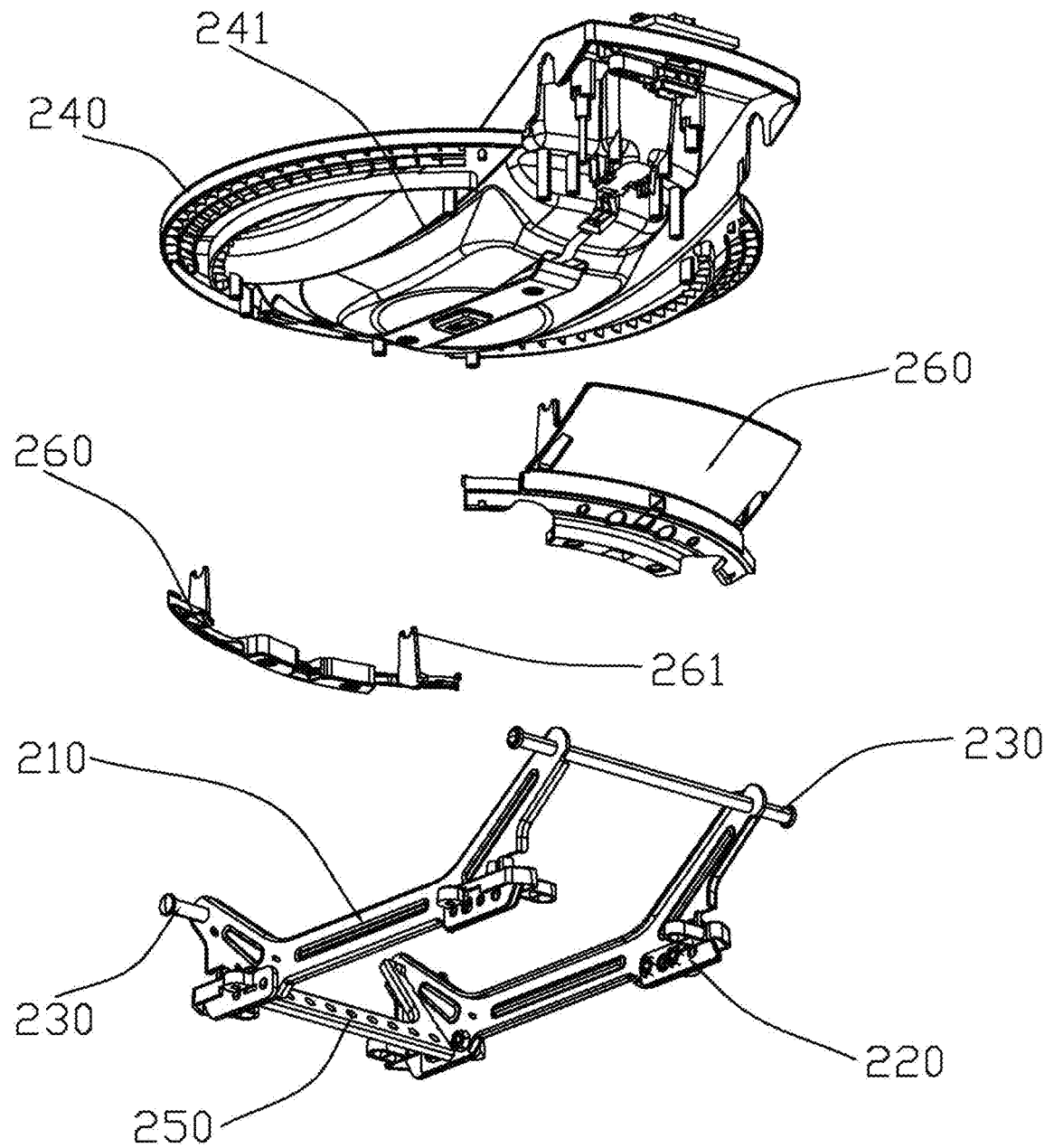
FIG. 4 is a structural exploded diagram of a bracket assembly in a first angle according to the present disclosure.
Figure 5:
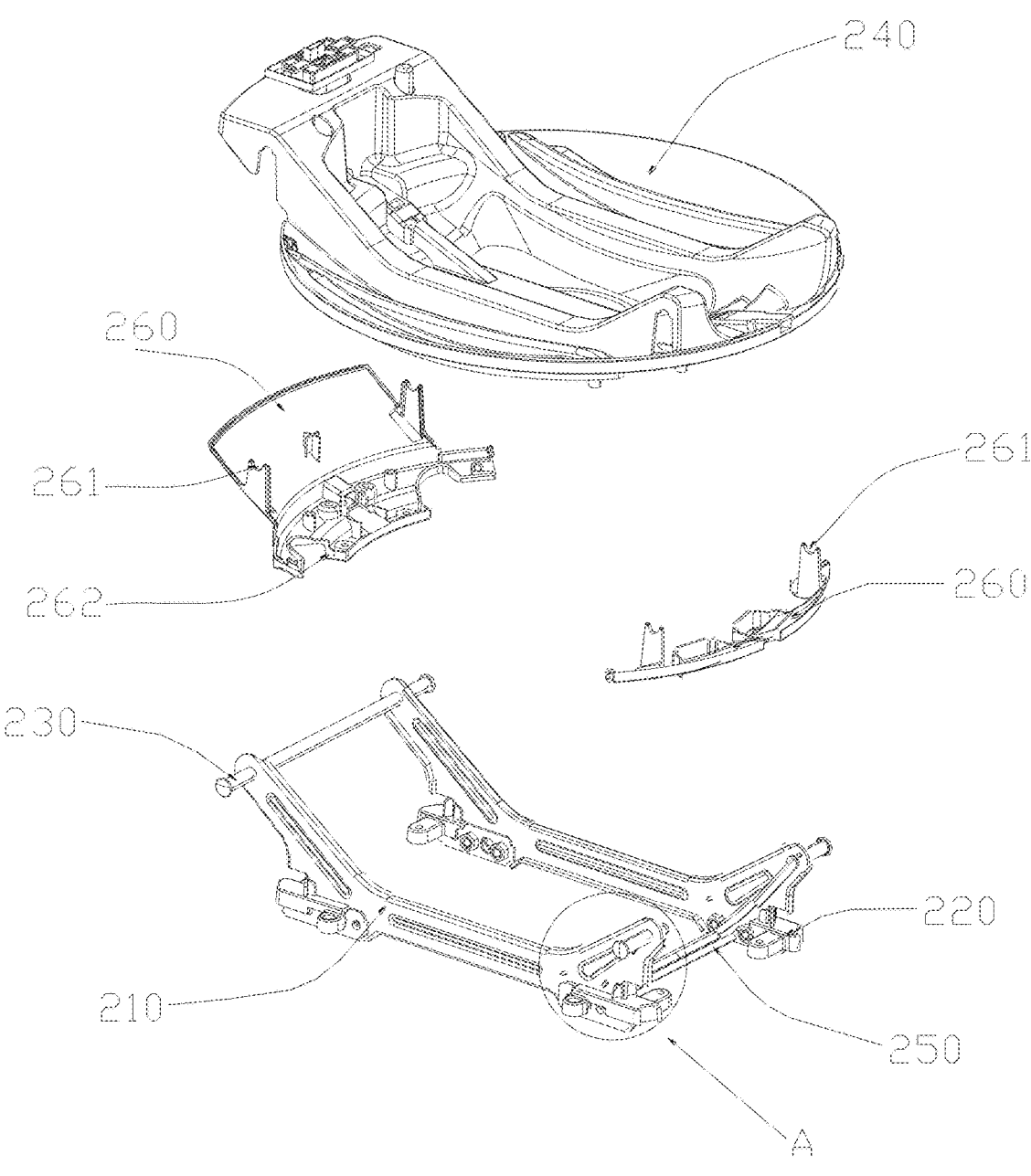
FIG. 5 is a structural exploded diagram of a bracket assembly in a second angle according to the present disclosure.
Figure 6:
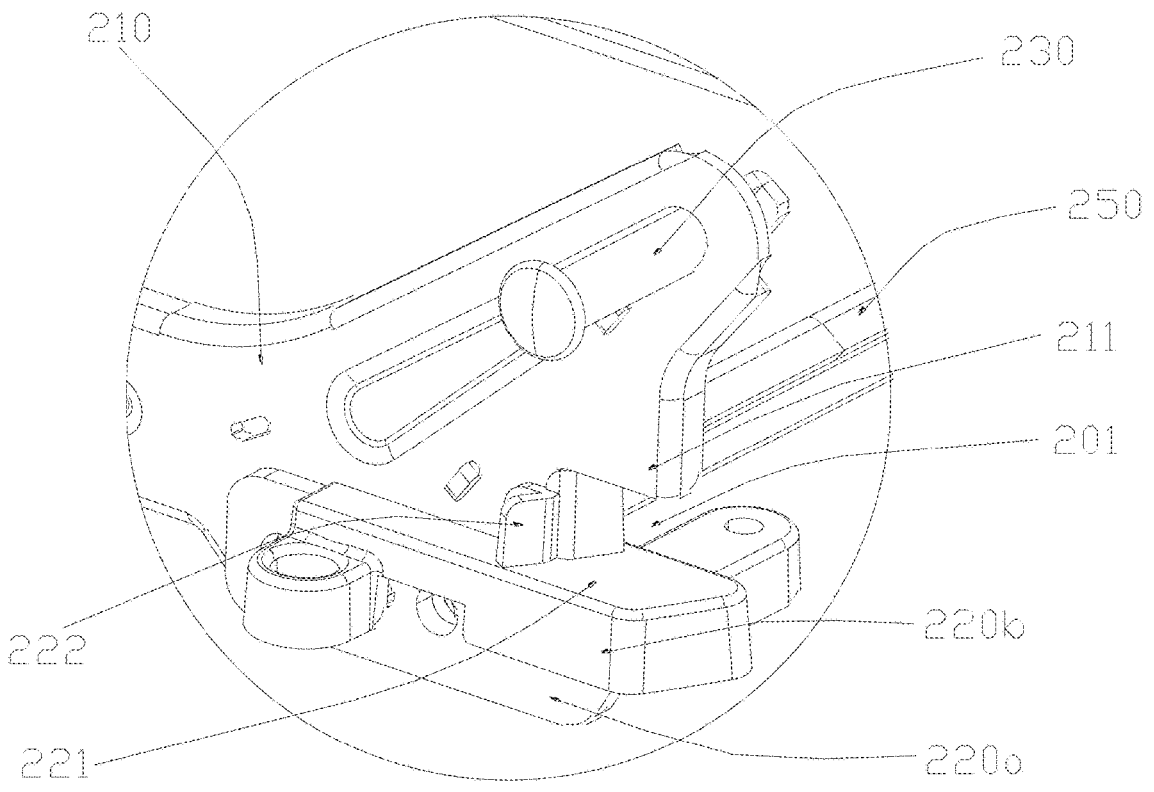
FIG. 6 is an enlarged view of circle A in FIG. 5.

Referring to FIG. 1 to FIG. 6, a safety seat base includes:

a base shell 100, wherein the base shell 100 is provided with an annular guide rail 101; and a bracket assembly 200, wherein the bracket assembly 200 includes at least two bracket main bodies 210 and several reinforcing members 220; clamping portions 211 are arranged at lower parts of two ends of the bracket main bodies 210; the reinforcing members 220 are connected to positions, close to the clamping portions 211, at end portions of the bracket main bodies 210; sliding chutes 201 are formed between surfaces of the reinforcing members 220 and surfaces of the clamping portions 211; and the sliding chutes 201 allow the annular guide rail 101 to be inserted and slide along the annular guide rail 101.

By the arrangement of the above structure, the sliding chutes 201 are formed between the surfaces of the reinforcing member 220 and the surfaces of the clamping portions 211, and the annular guide rail 101 is inserted into the sliding chutes 201, so that the bracket assembly 200 can rotate relative to the base shell 100. During use, a user can connect the safety seat to the bracket assembly 200 and adjust the orientation of the safety seat, which is convenient for use. In the traditional product, the sliding chutes 201 are usually directly provided on the bracket main bodies 210, but the bracket main bodies 210 of this product has low strength and are easily broken. The processing difficulty increases, and the production efficiency is low. Adding the reinforcing members 220 can improve the strength of the sliding chutes 201. The sliding chutes 201 are formed between the surfaces of reinforcing members 220 and the surfaces of the clamping portions 211, which can further reduce the production difficulty of the bracket main bodies 210, improve the production efficiency, reduce the mounting difficulty, and improve the assembling efficiency. Preferably, each reinforcing member 220 includes a reinforcing connector 220a and a friction sleeve 220b. The reinforcing connector 220a is connected to the bracket main body 210 by a bolt, and the friction sleeve 220b sleeves a surface of the reinforcing connector 220a. The bracket main body 210 and the reinforcing connector 220a are usually made of a metal material to improve the strength of the product. The friction sleeve 220b is usually made of a plastic material, which can effectively reduce wear and friction. Meanwhile, the plastic can have a deformation, so that the bracket assembly 200 slides more smoothly relative to the annular guide rail 101. Since the safety seat is generally arranged in an automobile, a child sitting in the seat may fall over forwards or backwards due to the inertia during acceleration and braking of the automobile. In this case, the bracket assembly 200 will be subjected to an obliquely upwards drag force. The reinforcing members 220 are arranged at front ends and rear ends of the bracket main bodies 210. The reinforcing members 220 resist against a lower surface of the annular guide rail 101, which can improve the structural strength and stability of this position. Preferably, the reinforcing members 220 are arranged on outer sides of the bracket main bodies 210, so that the bracket main bodies 210 are located between the two outermost reinforcing members 220, which can better balance the force and maintain the stability and balance of the product.

In this embodiment, each reinforcing member 220 is provided with a first contact portion 221 and a second contact portion 222; the second contact portion 222 extends along a surface of the first contact portion 221 towards each clamping portion 211; the first contact portion 221 is in contact with a lower surface of the annular guide rail 101; and the second contact portion 222 is in contact with an inner surface of the annular guide rail 101. By the arrangement of the above structure, during use, when the safety seat tilts forwards or backwards due to the inertia, the first contact portion 221 resists against the lower surface of the annular guide rail 101, and the second contact portion 222 is in contact with the inner surface of the annular guide rail 101, to counteract the drag force generated by the inertia and keep the stability of the product. Meanwhile, the second contact portion 222 further has a limiting function to prevent the annular guide rail 101 from being separated from the sliding chutes 201, so that the positions of the annular guide rail 101 and the sliding chutes 201 are limited, and the relative sliding between the annular guide rail 101 and the sliding chutes 201 can be smoother. Preferably, upper ends of the second contact portions 222 resist against the clamping portions 211, so that gaps are formed between the first contact portions 221 and lower surfaces of the clamping portions 211, and the bracket assembly 200 slides more smoothly relative to the annular guide rail 101, to avoid a stuck situation.

In this embodiment, the bracket assembly 200 further includes several locking rods 230; the locking rods 230 extend along upper parts of the two ends of the bracket main bodies 210 to two sides; and the locking rods 230 are configured to be connected to a locking assembly 400 on a seat. By the arrangement of the above structure, the locking rods 230 extend along the upper ends of the two ends of the bracket main bodies 210 to the two sides. During use, the locking assembly 400 on the seat is connected to the locking rods 230 to achieve the connection between the seat and the bracket assembly 200, making the connection convenient.

In this embodiment, the bracket assembly 200 further includes a pressure-bearing member 260; the pressure-bearing member 260 is connected to the bracket main bodies 210 and/or the locking rods 230; and a lower surface of the pressure-bearing member 260 is in contact with an upper surface of the annular guide rail 101. By the arrangement of the above structure, the lower surface of the pressure-bearing member 260 is in contact with the upper surface of the annular guide rail 101, so that the annular guide rail 101 can support the pressure-bearing member 260, thereby supporting the entire bracket assembly 200 and effectively counteracting the weight of the safety seat and the gravity of a user sitting in the safety seat. Meanwhile, a surface area of the pressure-bearing member 260 is large, so that a contact area with the annular guide rail 101 is larger, thereby reducing the pressure intensity per unit area, making the product firmer and more durable, and preventing breakage caused by local excessive force. Preferably, an arc-shaped clamping slot 261 is provided at an upper part of the pressure-bearing member 260; lower parts of the locking rods 230 resist against the arc-shaped clamping slot 261 to transfer the weight of the safety seat and the gravity of the user sitting in the safety seat to the pressure-bearing member 260 and then uniformly to the annular guide rail 101. Preferably, a limiting portion 262 is further arranged on the pressure-bearing member 260. The limiting portion 262 resists against an inner wall of the annular guide rail 101 to limit the relative positions of the pressure-bearing member 260 and the annular guide rail 101, thereby improving the stability of the product.

In this embodiment, the bracket assembly 200 further includes a cover plate 240; and the cover plate 240 is connected to the bracket main bodies 210, the pressure-bearing member 260, and the locking rods 230, and covers the annular guide rail 101. By the arrangement of the above structure, the cover plate 240 covers the annular guide rail 101 and the bracket assembly 200, which can prevent foreign objects from falling into the annular guide rail 101 and make the structure of the base more stable. Meanwhile, the base shell 100 includes a first shell 110 and a second shell 120. The first shell 110 and the second shell 120 are clamped to each other.

In this embodiment, an accommodating slot 241 is provided on a lower surface of the cover plate 240; and the bracket main bodies 210 are inserted into the accommodating slot 241 and resist against an inner wall of the accommodating slot 241. By the arrangement of the above structure, the bracket main bodies 210 are at least partially inserted into the accommodating slot 241 and resist against the inner wall of the accommodating slot 241. On the one hand, it can limit the relative positions of the bracket main bodies 210 and the cover plate 240, and on the other hand, the bracket main bodies 210 can provide supporting for the cover plate 240, to improve the overall strength and stability of the product.

In this embodiment, the bracket assembly 200 further includes a bracket connector 250; the bracket connector 250 is connected to the various bracket main bodies 210; and the bracket connector 250 resists against the lower surface of the cover plate 240. By the arrangement of the above structure, to enhance the strength of the bracket assembly 200, the bracket connector 250 is connected to the bracket main bodies 210 to form a whole, which can effectively avoid deformation and displacement of the bracket main bodies 210.

Figure 7:
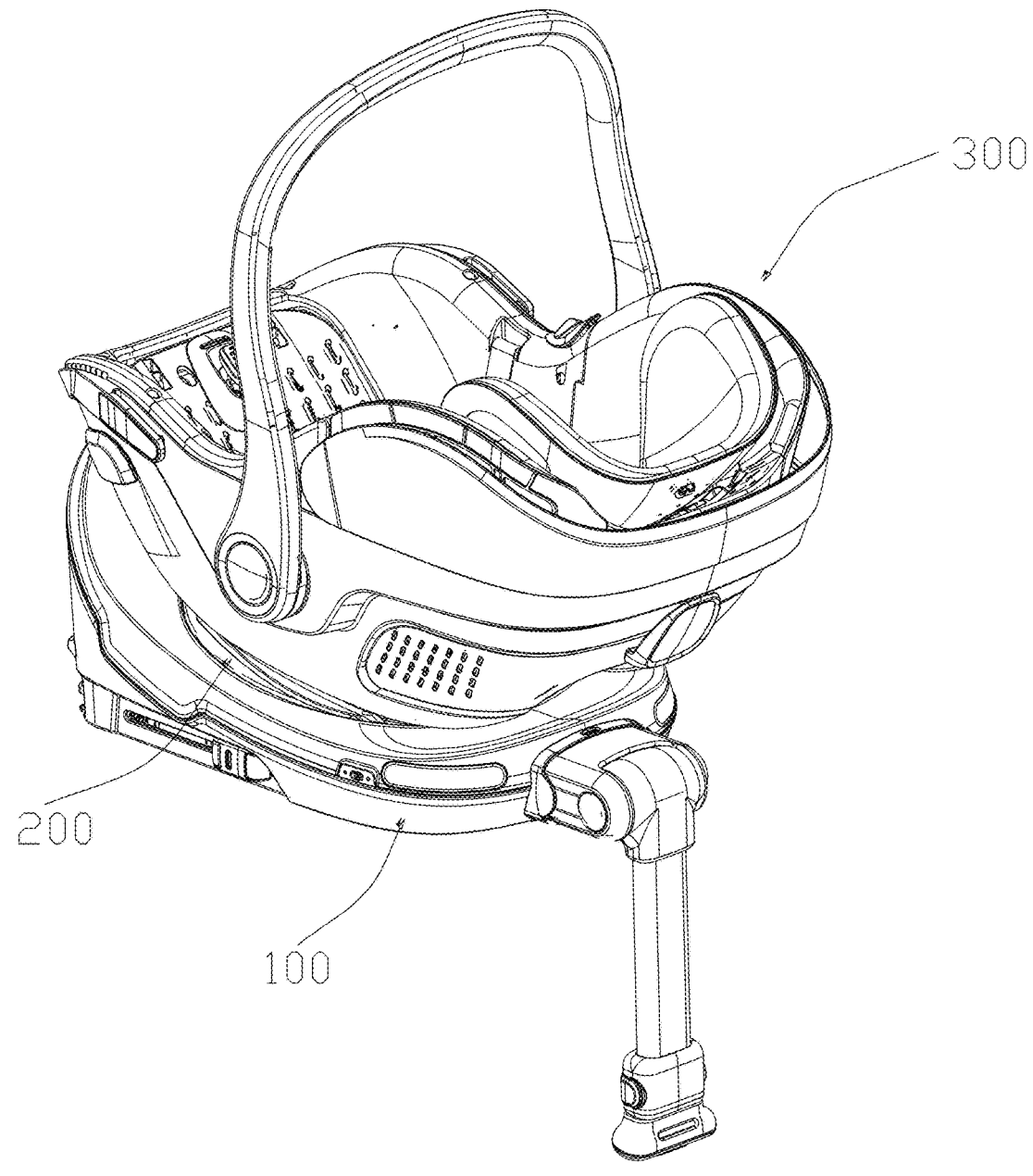
FIG. 7 is a schematic diagram of an entire structure of a safety seat according to the present disclosure.
Figure 8:
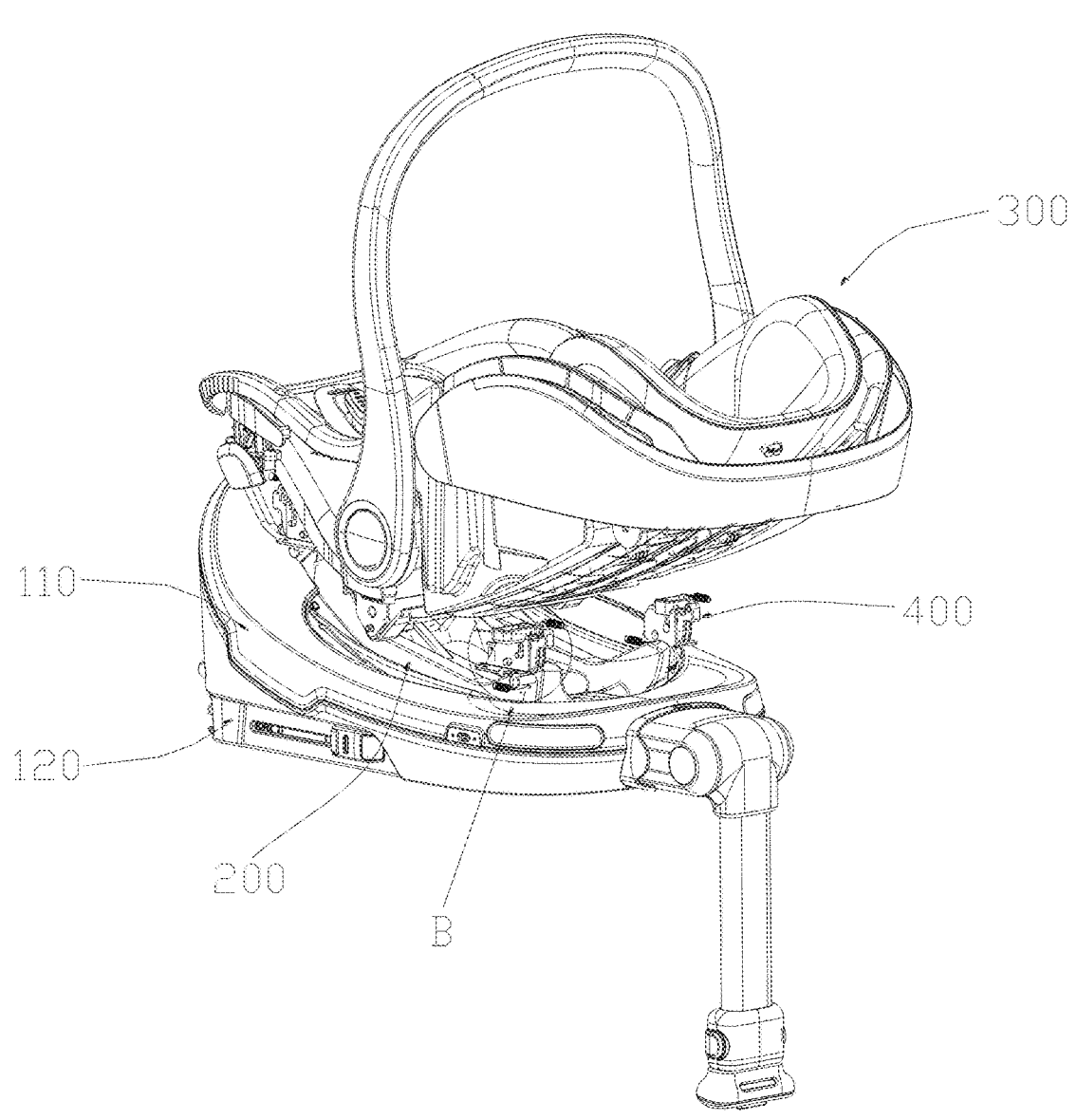
FIG. 8 is a schematic partially structural diagram of a safety seat according to the present disclosure.
Figure 9:
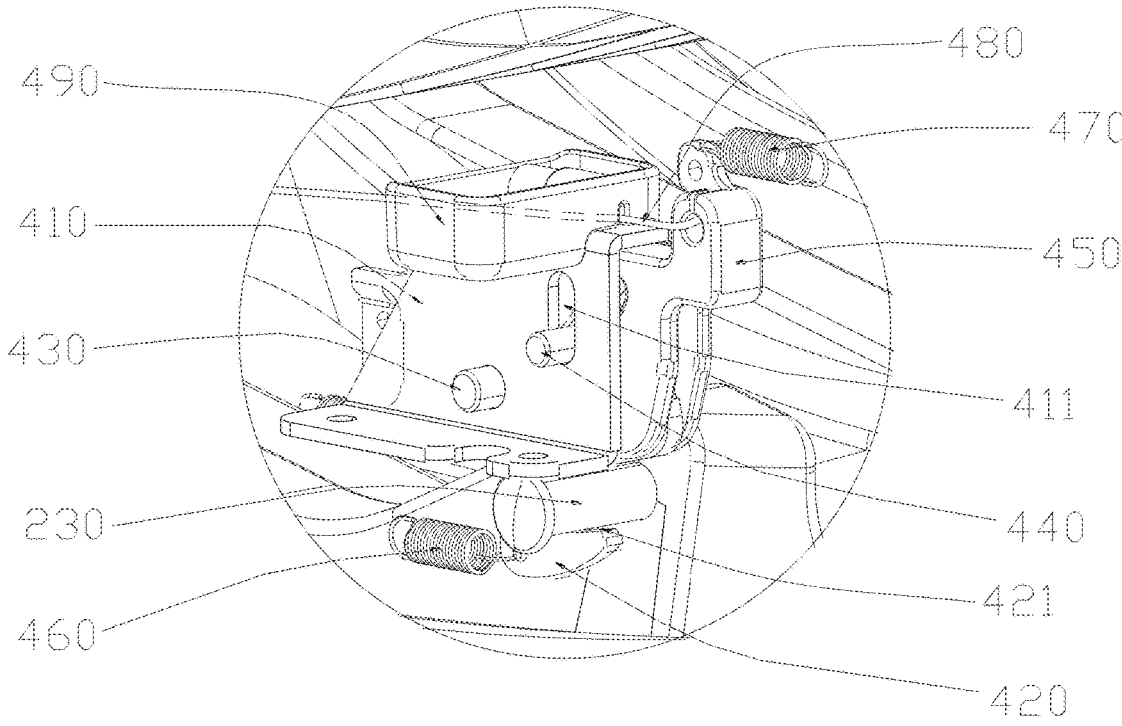
FIG. 9 is an enlarged view of circle B in FIG. 8.
Figure 10:
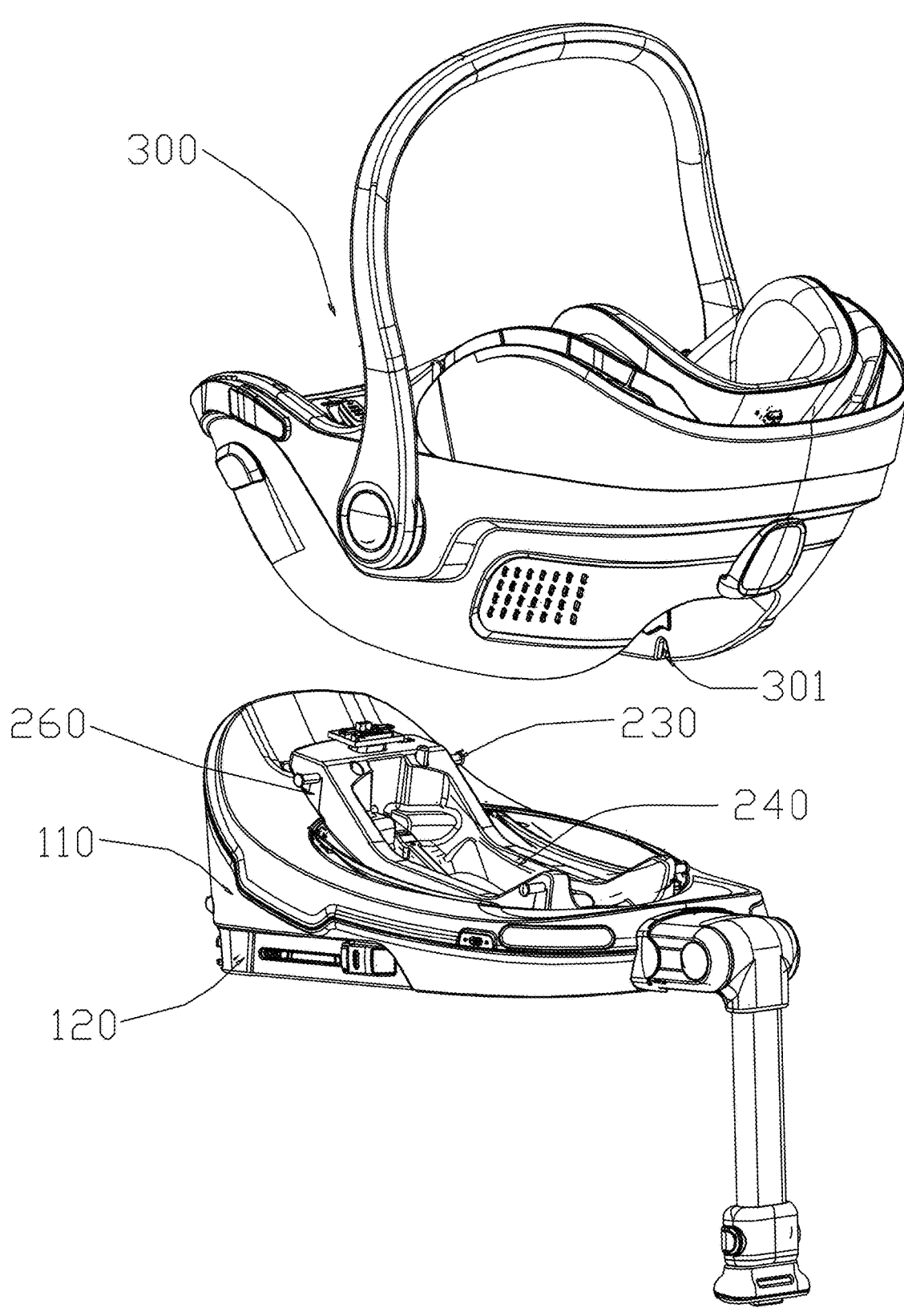
FIG. 10 is a structural exploded diagram of a safety seat according to the present disclosure.
Figure 11:
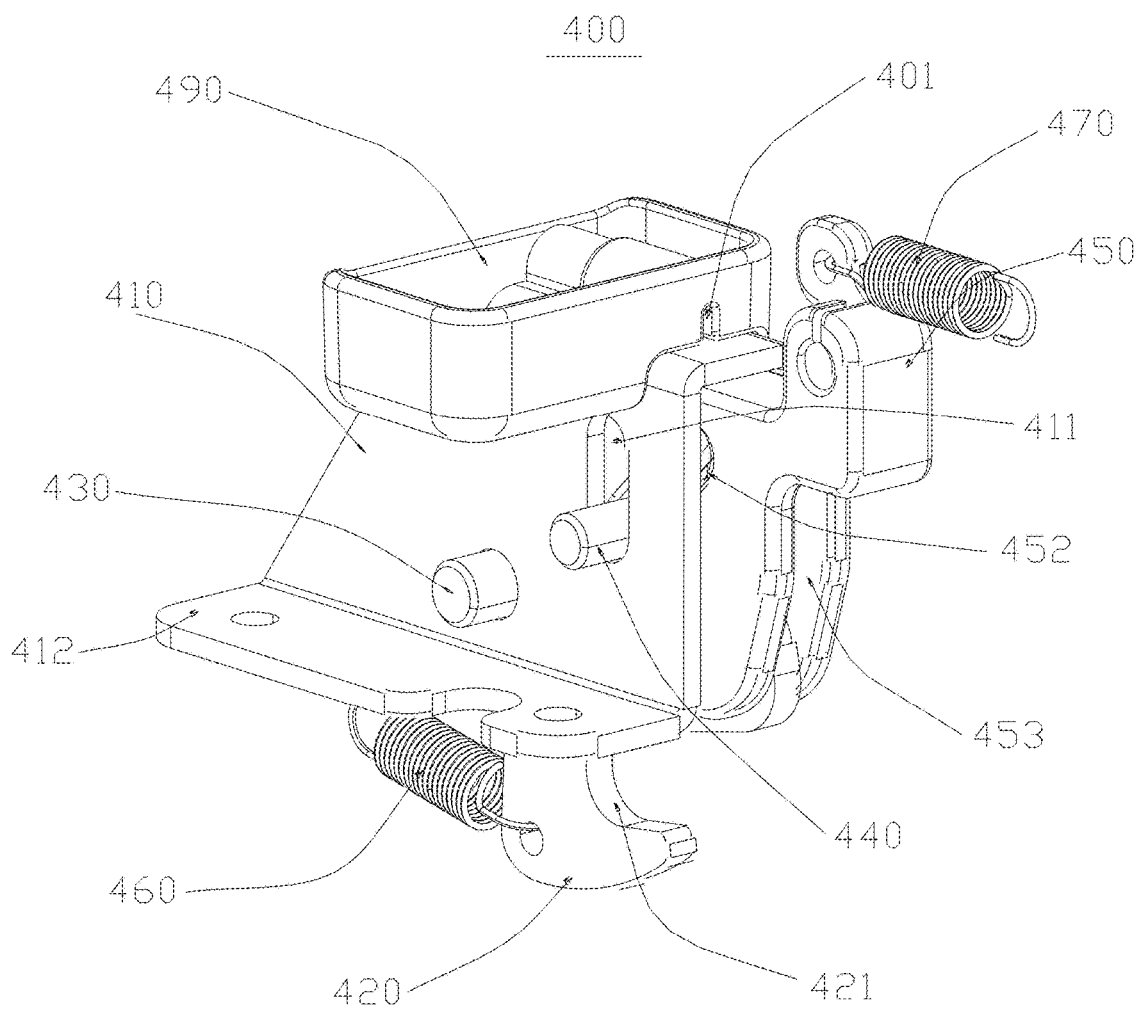
FIG. 11 is a schematic structural diagram of a locking assembly in a first state according to the present disclosure, wherein a clamping member is located at a locking position, and a limiting member is located at a first position.
Figure 12:
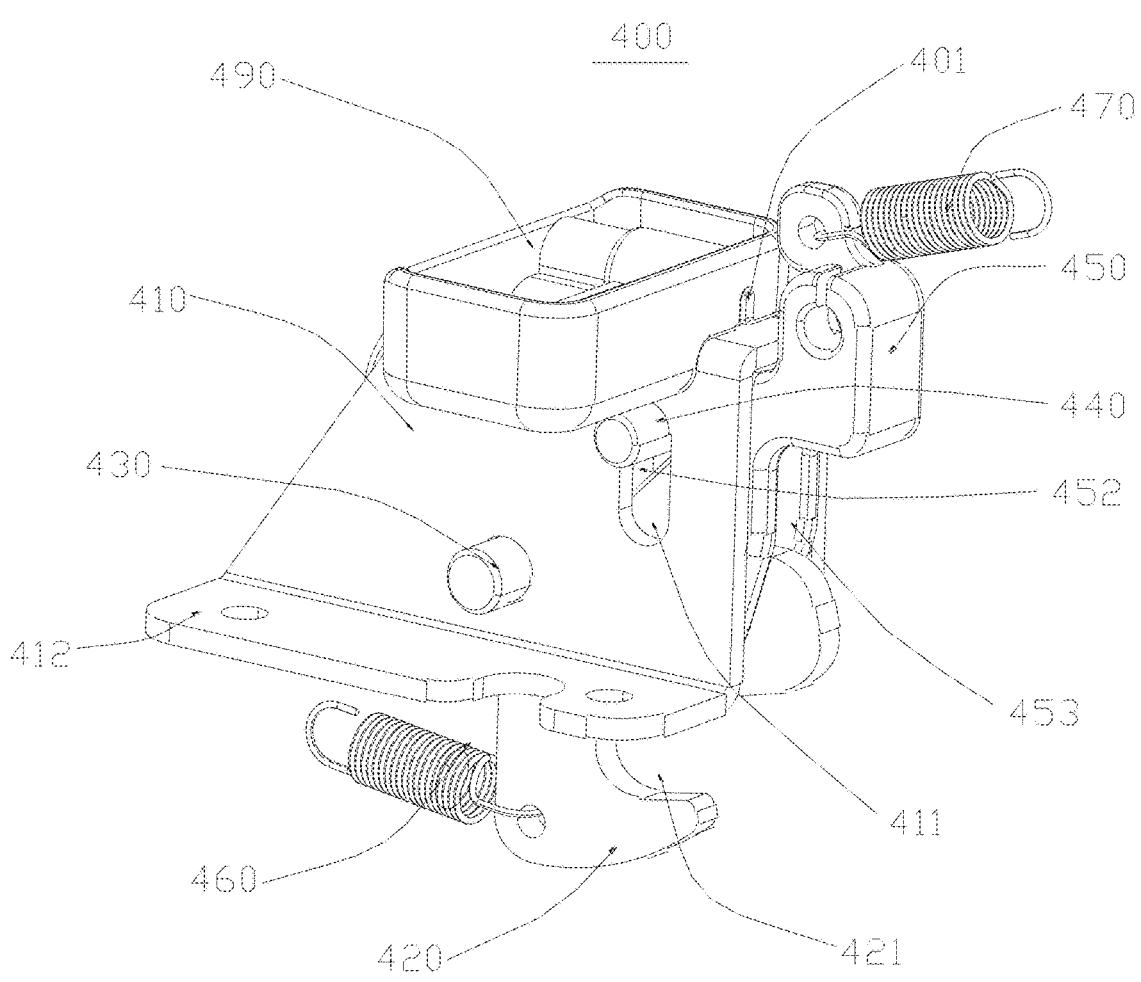
FIG. 12 is a schematic structural diagram of a locking assembly in a second state according to the present disclosure, wherein a clamping member is located at a locking position, and a limiting member is located at a second position.
Figure 13:
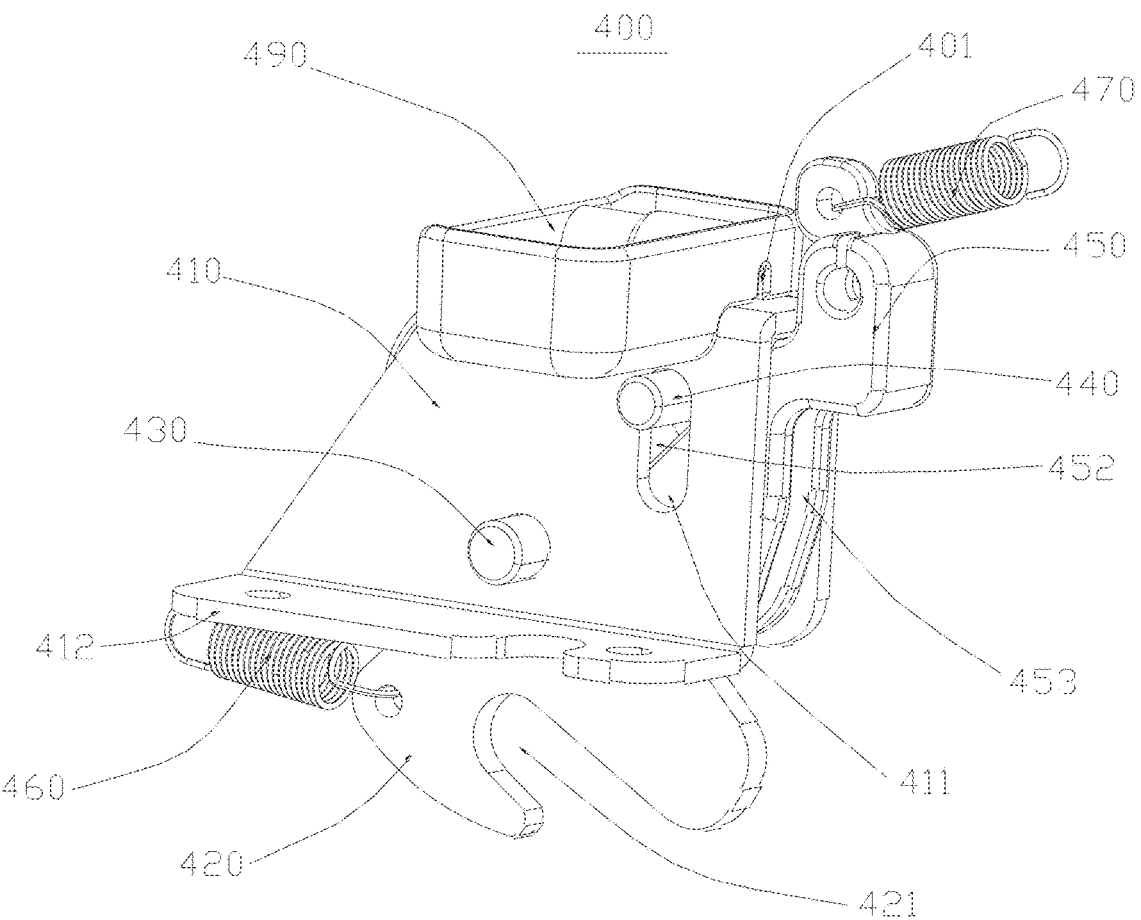
FIG. 13 is a schematic structural diagram of a locking assembly in a third state according to the present disclosure, wherein a clamping member is located at a releasing position, and a limiting member is located at a second position.
Figure 14:
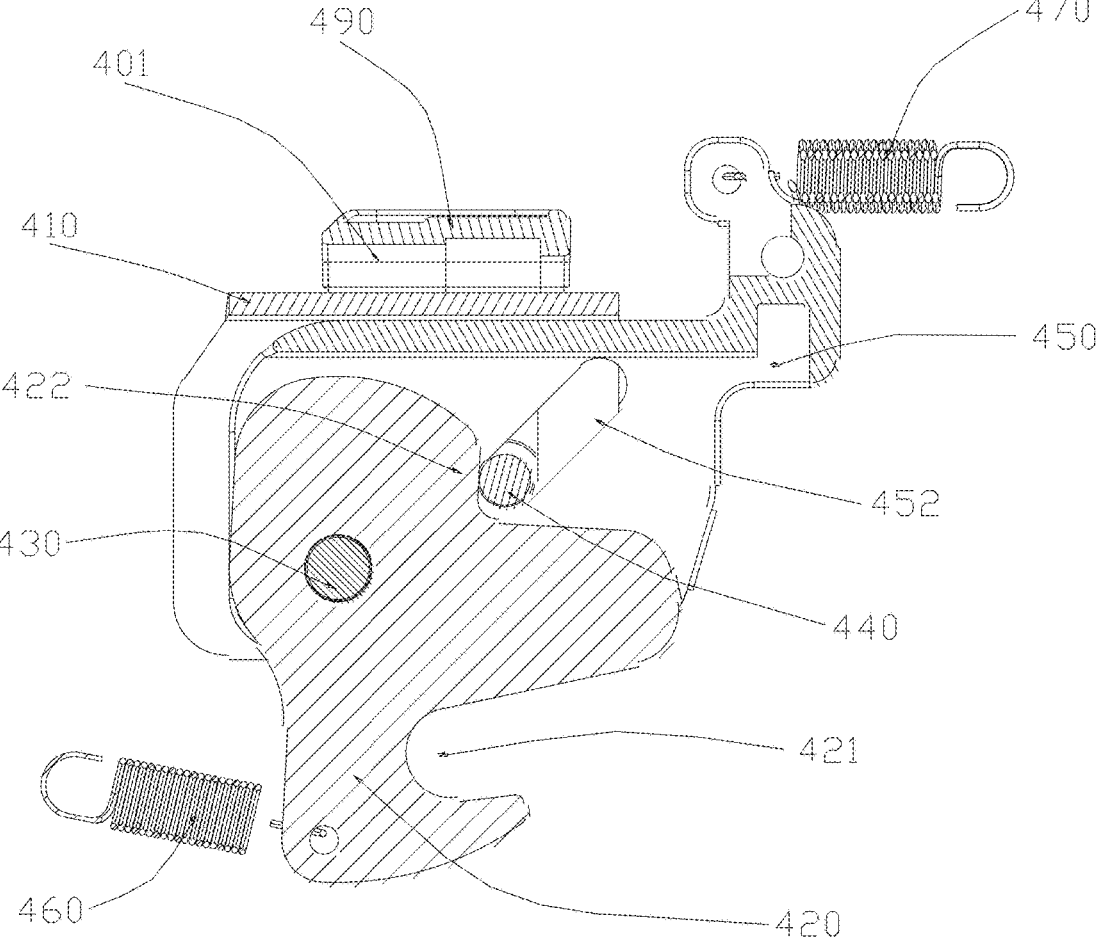
FIG. 14 is a cross-sectional view of a locking assembly in a first state according to the present disclosure, wherein a clamping member is located at a locking position, and a limiting member is located at a first position.
Figure 15:
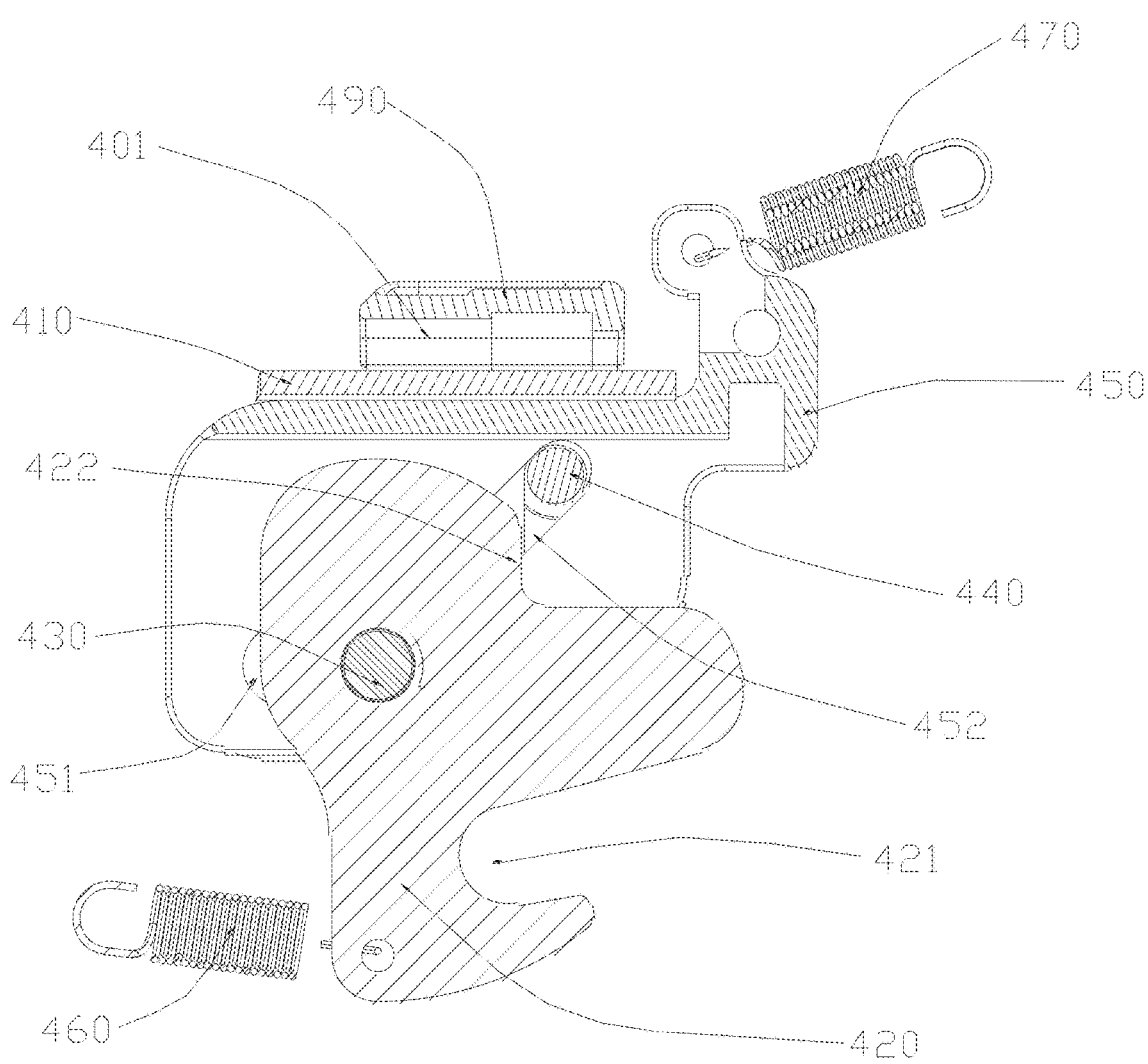
FIG. 15 is a cross-sectional view of a locking assembly in a second state according to the present disclosure, wherein a clamping member is located at a locking position, and a limiting member is located at a second position.
Figure 16:
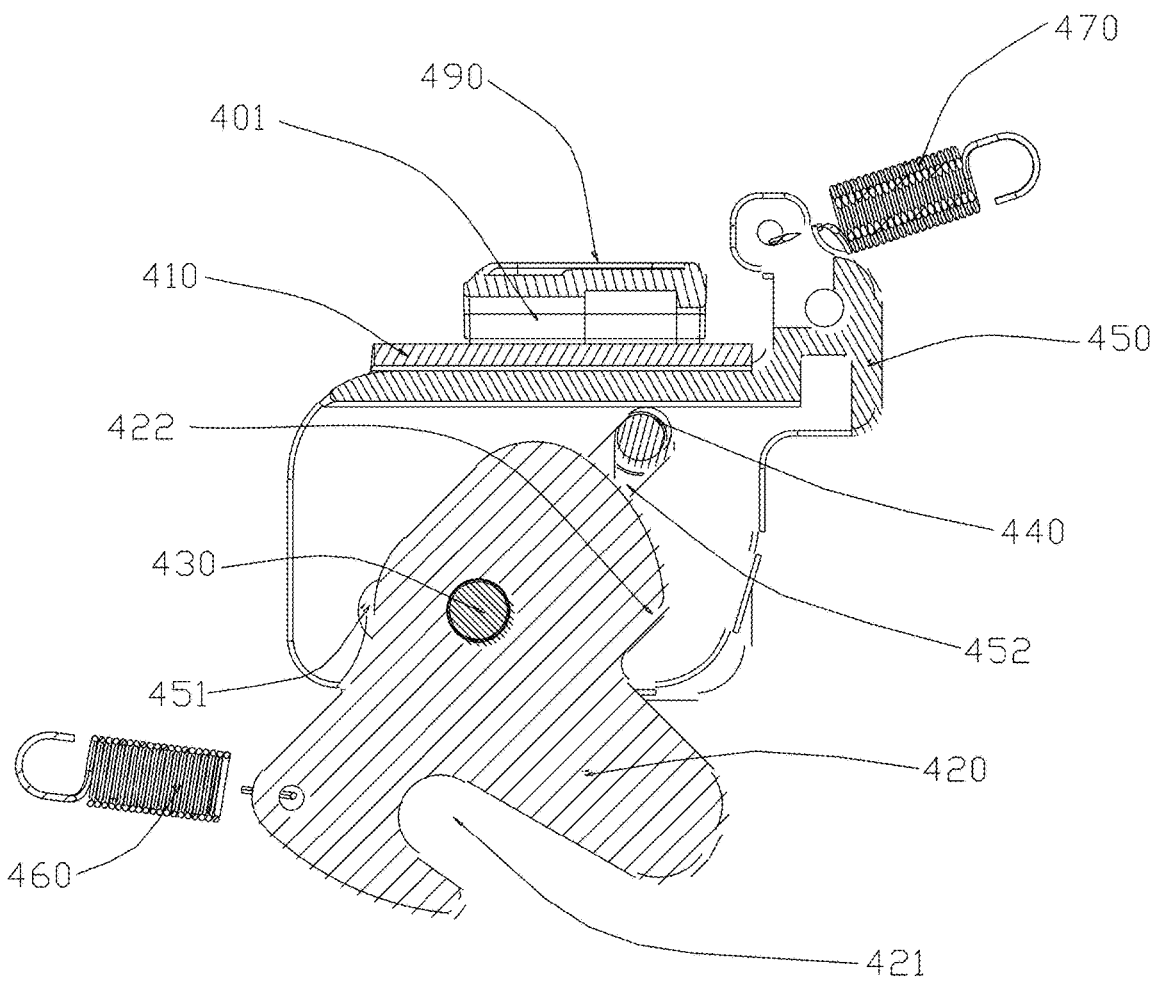
FIG. 16 is a cross-sectional view of a locking assembly in a third state according to the present disclosure, wherein a clamping member is located at a releasing position, and a limiting member is located at a second position.
Figure 17:
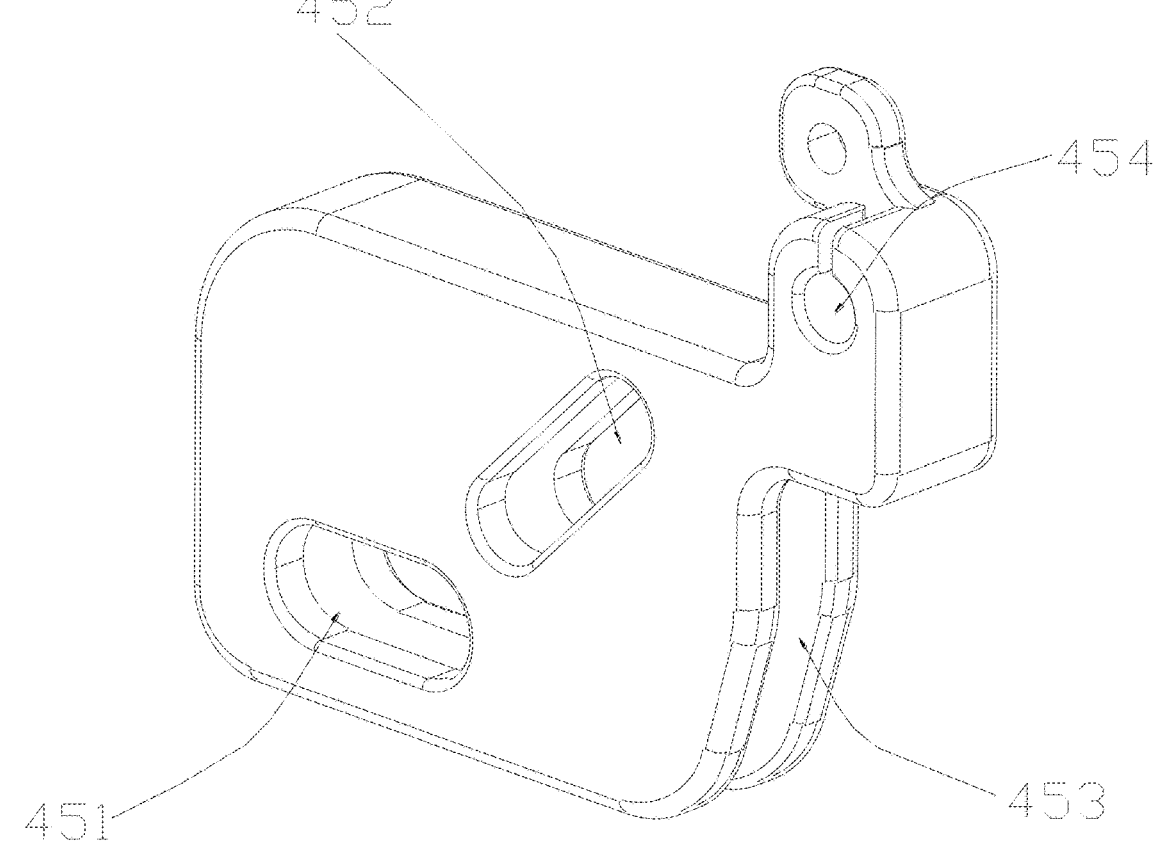
FIG. 17 is a schematic structural diagram of a limiting member according to the present disclosure.

Referring to FIG. 1 to FIG. 17, a safety seat includes:

a safety seat base, wherein the safety seat base includes:

a base shell 100, wherein the base shell 100 is provided with an annular guide rail 101;

a bracket assembly 200, wherein the bracket assembly 200 includes at least two bracket main bodies 210 and several reinforcing members 220; clamping portions 211 are arranged at lower parts of two ends of the bracket main bodies 210; the reinforcing members 220 are connected to positions, close to the clamping portions 211, at end portions of the bracket main bodies 210; sliding chutes 201 are formed between surfaces of the reinforcing members 220 and surfaces of the clamping portions 211; the sliding chutes 201 allow the annular guide rail 101 to be inserted and slide along the annular guide rail 101; and a seat 300, wherein the seat 300 is provided with a locking assembly 400, and the locking assembly 400 is detachably connected to the bracket assembly 200.

By the arrangement of the above structure, the sliding chutes 201 are formed between the surfaces of the reinforcing member 220 and the surfaces of the clamping portions 211, and the annular guide rail 101 is inserted into the sliding chutes 201, so that the bracket assembly 200 can rotate relative to the base shell 100. During use, a user can connect the safety seat to the bracket assembly 200 and adjust the orientation of the safety seat, which is convenient for use. In the traditional product, the sliding chutes 201 are usually directly provided on the bracket main bodies 210, but the bracket main bodies 210 of this product has low strength and are easily broken. The processing difficulty increases, and the production efficiency is low. Adding the reinforcing members 220 can improve the strength of the sliding chutes 201. The sliding chutes 201 are formed between the surfaces of reinforcing members 220 and the surfaces of the clamping portions 211, which can further reduce the production difficulty of the bracket main bodies 210, improve the production efficiency, reduce the mounting difficulty, and improve the assembling efficiency. Preferably, each reinforcing member 220 includes a reinforcing connector 220a and a friction sleeve 220b. The reinforcing connector 220a is connected to the bracket main body 210 by a bolt, and the friction sleeve 220b sleeves a surface of the reinforcing connector 220a. The bracket main body 210 and the reinforcing connector 220a are usually made of a metal material to improve the strength of the product. The friction sleeve 220b is usually made of a plastic material, which can effectively reduce wear and friction. Meanwhile, the plastic can have a deformation, so that the bracket assembly 200 slides more smoothly relative to the annular guide rail 101. Since the safety seat is generally arranged in an automobile, a child sitting in the seat may fall over forwards or backwards due to the inertia during acceleration and braking of the automobile. In this case, the bracket assembly 200 will be subjected to an obliquely upwards drag force. The reinforcing members 220 are arranged at front ends and rear ends of the bracket main bodies 210. The reinforcing members 220 resist against a lower surface of the annular guide rail 101, which can improve the structural strength and stability of this position. Preferably, the reinforcing members 220 are arranged on outer sides of the bracket main bodies 210, so that the bracket main bodies 210 are located between the two outermost reinforcing members 220, which can better balance the force and maintain the stability and balance of the product. Furthermore, if the locking assembly 400 is arranged on the base, the seat 300 will apply a downward impact force on the locking assembly 400 during mounting and use, which can easily damage the locking assembly 400. Moreover, the locking assembly 400 is arranged on the base, leading to poor safety. A finger of a child easily gets stuck in the locking assembly 400 when the child plays. If the locking assembly 400 is arranged on the seat 300, the impact force generated by the seat 300 during mounting and use mainly acts on a connecting portion of the base. On the one hand, it is more convenient to use, and on the other hand, the base provides more stable supporting for the seat 300. The service life of the locking assembly 400 is longer, and there is no risk that the child touches the base.

In this embodiment, each reinforcing member 220 is provided with a first contact portion 221 and a second contact portion 222; the second contact portion 222 extends along a surface of the first contact portion 221 towards each clamping portion 211; the first contact portion 221 is in contact with a lower surface of the annular guide rail 101; and the second contact portion 222 is in contact with an inner surface of the annular guide rail 101. By the arrangement of the above structure, during use, when the safety seat tilts forwards or backwards due to the inertia, the first contact portion 221 resists against the lower surface of the annular guide rail 101, and the second contact portion 222 is in contact with the inner surface of the annular guide rail 101, to counteract the drag force generated by the inertia and keep the stability of the product. Meanwhile, the second contact portion 222 further has a limiting function to prevent the annular guide rail 101 from being separated from the sliding chutes 201, so that the positions of the annular guide rail 101 and the sliding chutes 201 are limited, and the relative sliding between the annular guide rail 101 and the sliding chutes 201 can be smoother. Preferably, upper ends of the second contact portions 222 resist against the clamping portions 211, so that gaps are formed between the first contact portions 221 and lower surfaces of the clamping portions 211, and the bracket assembly 200 slides more smoothly relative to the annular guide rail 101, to avoid a stuck situation.

In this embodiment, the bracket assembly 200 further includes several locking rods 230; the locking rods 230 extend along upper parts of the two ends of the bracket main bodies 210 to two sides; and the locking rods 230 are detachably connected to the locking assembly 400. By the arrangement of the above structure, the locking rods 230 extend along the upper ends of the two ends of the bracket main bodies 210 to the two sides. During use, the locking assembly 400 on the seat is connected to the locking rods 230 to achieve the connection between the seat and the bracket assembly 200, making the connection convenient. Preferably, for the stability of connection, four locking rods 230 are usually provided, which are respectively located on two sides of a front end and two sides of a rear end of the bracket assembly 200. Correspondingly, there are also four locking assemblies 400, which can achieve stable connection between the seat 300 and the bracket assembly 200.

In this embodiment, the bracket assembly 200 further includes a pressure-bearing member 260; the pressure-bearing member 260 is connected to the bracket main bodies 210 and/or the locking rods 230; and a lower surface of the pressure-bearing member 260 is in contact with an upper surface of the annular guide rail 101. By the arrangement of the above structure, the lower surface of the pressure-bearing member 260 is in contact with the upper surface of the annular guide rail 101, so that the annular guide rail 101 can support the pressure-bearing member 260, thereby supporting the entire bracket assembly 200 and effectively counteracting the weight of the safety seat and the gravity of a user sitting in the safety seat. Meanwhile, a surface area of the pressure-bearing member 260 is large, so that a contact area with the annular guide rail 101 is larger, thereby reducing the pressure intensity per unit area, making the product firmer and more durable, and preventing breakage caused by local excessive force. Preferably, an arc-shaped clamping slot 261 is provided at an upper part of the pressure-bearing member 260; lower parts of the locking rods 230 resist against the arc-shaped clamping slot 261 to transfer the weight of the safety seat and the gravity of the user sitting in the safety seat to the pressure-bearing member 260 and then uniformly to the annular guide rail 101. Preferably, a limiting portion 262 is further arranged on the pressure-bearing member 260. The limiting portion 262 resists against an inner wall of the annular guide rail 101 to limit the relative positions of the pressure-bearing member 260 and the annular guide rail 101, thereby improving the stability of the product.

In this embodiment, the bracket assembly 200 further includes a cover plate 240; and the cover plate 240 is connected to the bracket main bodies 210, the pressure-bearing member 260, and the locking rods 230, and covers the annular guide rail 101. By the arrangement of the above structure, the cover plate 240 covers the annular guide rail 101 and the bracket assembly 200, which can prevent foreign objects from falling into the annular guide rail 101 and make the structure of the base more stable. Meanwhile, the base shell 100 includes a first shell 110 and a second shell 120. The first shell 110 and the second shell 120 are clamped to each other.

In this embodiment, an accommodating slot 241 is provided on a lower surface of the cover plate 240; and the bracket main bodies 210 are inserted into the accommodating slot 241 and resist against an inner wall of the accommodating slot 241. By the arrangement of the above structure, the bracket main bodies 210 are at least partially inserted into the accommodating slot 241 and resist against the inner wall of the accommodating slot 241. On the one hand, it can limit the relative positions of the bracket main bodies 210 and the cover plate 240, and on the other hand, the bracket main bodies 210 can provide supporting for the cover plate 240, to improve the overall strength and stability of the product.

In this embodiment, the bracket assembly 200 further includes a bracket connector 250; the bracket connector 250 is connected to the various bracket main bodies 210; and the bracket connector 250 resists against the lower surface of the cover plate 240. By the arrangement of the above structure, to enhance the strength of the bracket assembly 200, the bracket connector 250 is connected to the bracket main bodies 210 to form a whole, which can effectively avoid deformation and displacement of the bracket main bodies 210.

In this embodiment, the locking assembly 400 includes a locking connector 410 and a clamping member 420; the locking connector 410 is connected to the seat 300; the clamping member 420 is connected to the locking connector 410 through a rotating shaft 430 and rotates between a locking position and a releasing position; the clamping member 420 is provided with a locking slot 421; when the clamping member 420 rotates to the locking position, the locking rods 230 are clamped into the locking slot 421; and when the clamping member 420 rotates to the releasing position, the locking rods 230 are detached from the locking slot 421. By the arrangement of the above structure, the seat 300 is provided with an insertion slot 301. The insertion slot 301 is communicated to a space where the locking assembly 400 is located. During mounting, an opening direction of the locking slot 421 is oblique downwards, and the locking rods 230 are aligned with and inserted into the insertion slot 301. The seat 300 is pressed down, and the clamping member 420 rotates to the locking position. In this case, the locking rods 230 are clamped into the locking slot 421, and the opening direction of the locking slot 421 changes to a horizontal direction. The locking assembly 400 is connected to the locking rods 230, thereby connecting the seat 300 to the base, making it convenient for a user to connect and use the product. To remove the product, the clamping member 420 rotates to the releasing position, the opening direction of the locking slot 421 is oblique downwards, and the locking rods 230 are detached from the locking slot 421. The seat 300 is lifted upwards, and the locking rods 230 are separated from the insertion slot 301 to complete removal of the seat 300 from the base. The product is convenient to use.

In this embodiment, the locking assembly 400 further includes a limiting shaft 440 and a limiting member 450; the clamping member 420 is provided with a resisting portion 422; the limiting member 450 moves relative to the locking connector 410 between a first position and a second position; when the limiting member 450 moves to the first position, the limiting shaft 440 resists against the resisting portion 422 to hinder the rotation of the clamping member 420; and when the limiting member 450 moves to the second position, the limiting member 450 drives the limiting shaft 440 to be detached from the resisting portion 422, to allow the clamping member 420 to rotate. By the arrangement of the above structure, to mount the seat 300, the locking rods 230 are aligned with and inserted into the insertion slot 301. The seat 300 is pressed down, and the clamping member 420 rotates to the locking position. In this case, the locking rods 230 are clamped into the locking slot 421. The limiting member 450 moves to the first position, and the lifting shaft 440 resists against the resisting portion 422. The limiting shaft 440 hinders the rotation of the clamping member 420, so that the locking assembly 400 is stably locked at the locking rods 230, thereby improving the stability of the product. To remove the seat 300, the limiting member 450 moves to the second position. The limiting member 450 drives the limiting shaft 440 to be detached from the resisting portion 422. The clamping member 420 rotates to the releasing position, so that a user can separate the seat 300 from the base. Preferably, the locking connector 410 is further provided with a first U-shaped groove and an outwards-extending folding plate 412; the folding plate 412 is configured to allow a bolt and another connector to be connected to the seat 300, thereby improving the stability of connection; and the first U-shaped groove can accommodate the limiting member 450, so that the limiting member 450 slides in the first U-shaped groove.

In this embodiment, the limiting member 450 is provided with a first waist hole 451 arranged horizontally and a second waist hole 452 arranged obliquely; a third waist hole 411 arranged vertically is provided on the locking connector 410; the rotating shaft 430 is inserted into the first waist hole 451; and the limiting member 450 is inserted into the second waist hole 452 and the third waist hole 411. By the arrangement of the above structure, the rotating shaft 430 is inserted into the first waist hole 451, which allows the limiting member 450 to move transversely relative to the locking connector 410. The limiting shaft 440 is simultaneously inserted into the oblique second waist hole 452 and the vertical third waist hole 411. When the limiting member 450 moves transversely, the second waist hole 452 resists against a surface of the limiting shaft 440, to drive the limiting shaft 440 to move up and down along the vertical third waist hole 411, thereby enabling the limiting shaft 440 to resist against or be detached from the resisting portion 422, so that the seat 300 and the base are locked and unlocked, and the product is more stable. Preferably, the limiting member 450 is provided with a second U-shaped groove 453, and the clamping member 420 is partially arranged in the second U-shaped groove. A portion of the clamping member 420 where the locking slot 421 is located extends out of the second U-shaped groove 453, so that it is convenient to clamp the locking rods 230, and the product is more convenient to use.

In this embodiment, the locking assembly 400 further includes a first elastic member 460; two ends of the first elastic member 460 are respectively connected to the clamping member 420 and the seat 300; and elastic potential energy of the first elastic member 460 enables the clamping member 420 to have a trend to move towards the releasing position. By the arrangement of the above structure, when the limiting shaft 440 resists against the resisting portion 422, the first elastic member 460 deforms and stores the elastic potential energy. When the limiting shaft 440 is detached from the resisting portion 422, the first elastic member 460 is reset and drives the clamping member 420 to move towards the releasing position, so that the locking rods 230 are detached from the locking slot 421, making it convenient for a user to detach the seat 300 from the base.

In this embodiment, the locking assembly 400 further includes a second elastic member 470; two ends of the second elastic member 470 are respectively connected to the limiting member 450 and the seat 300; and elastic potential energy of the second elastic member 470 enables the limiting member 450 to have a trend to move towards the first position. By the arrangement of the above structure, when the limiting member 450 moves to the second position under the action of external force, the second elastic member 470 deforms, and the limiting member 450 drives the limiting shaft 440 to be detached from the resisting portion 422. The clamping member 420 rotates to the releasing position, so that a user can detach the seat 300 from the base. When the second elastic member 470 is reset, the second elastic member 470 drives the limiting member 450 to move towards the first position, so that the limiting shaft 440 returns to a state of being clamped to the resisting portion 422, preparing for next mounting of the seat 300 and the base.

In this embodiment, the locking assembly 400 further includes a traction member 480; and the traction member 480 is connected to the limiting member 450 and drives the limiting member 450 to move towards the second position under the action of external force. By the arrangement of the above structure, during use, the external force drives the traction member 480. The traction member 480 drives the limiting member 450 to move towards the second position. The limiting member 450 drives the limiting shaft 440 to move, so that the limiting shaft 440 is detached from the resisting portion 422, and the clamping member 420 is allowed to rotate to achieve unlocking.

In this embodiment, the traction member 480 is a traction rope. The locking connector 410 is provided with a traction rope pressing block 490. A limiting channel 401 is formed between the traction rope pressing block 490 and the locking connector 410, and the traction rope passes through the limiting channel 401. By the arrangement of the above structure, the traction rope passes through the limiting channel 401, which can limit the traction rope and improve the stability of the product. The traction rope is connected to a connecting hole 454 on the limiting member 450. Preferably, the seat 300 is provided with an unlock button. The unlock button is connected to a plurality of traction ropes. The unlock button is pressed to drive the plurality of traction ropes, thereby driving the limiting member 450 to move to the second position. The limiting member 450 drives the limiting shaft 440 to be detached from the resisting portion 422, achieving unlocking. The product is convenient to operate.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

The invention claimed is:

1. A safety seat base, comprising:
a base shell, wherein the base shell is provided with an annular guide rail; and
a bracket assembly, wherein the bracket assembly comprises at least two bracket main bodies and several reinforcing members; clamping portions are arranged at lower parts of two ends of the bracket main bodies; the reinforcing members are connected to positions, close to the clamping portions, at end portions of the bracket main bodies; sliding chutes are formed between surfaces of the reinforcing members and surfaces of the clamping portions; and the sliding chutes allow the annular guide rail to be inserted and slide along the annular guide rail.

2. The safety seat base according to claim 1, wherein each reinforcing member is provided with a first contact portion and a second contact portion; the second contact portion extends along a surface of the first contact portion towards each clamping portion; the first contact portion is in contact with a lower surface of the annular guide rail; and the second contact portion is in contact with an inner surface of the annular guide rail.

3. The safety seat base according to claim 1, wherein the bracket assembly further comprises several locking rods; the locking rods extend along upper parts of the two ends of the bracket main bodies to two sides; and the locking rods are configured to be connected to a locking assembly on a seat.

4. The safety seat base according to claim 3, wherein the bracket assembly further comprises a pressure-bearing member; the pressure-bearing member is connected to the bracket main bodies and/or the locking rods; and a lower surface of the pressure-bearing member is in contact with an upper surface of the annular guide rail.

5. The safety seat base according to claim 4, wherein the bracket assembly further comprises a cover plate; and the cover plate is connected to the bracket main bodies, the pressure-bearing member, and the locking rods, and covers the annular guide rail.

6. The safety seat base according to claim 5, wherein an accommodating slot is provided on a lower surface of the cover plate; and the bracket main bodies are inserted into the accommodating slot and resist against an inner wall of the accommodating slot.

7. The safety seat base according to claim 5, wherein the bracket assembly further comprises a bracket connector; the bracket connector is connected to the various bracket main bodies; and the bracket connector resists against the lower surface of the cover plate.

8. A safety seat, comprising:
a safety seat base, wherein the safety seat base comprises:
a base shell, wherein the base shell is provided with an annular guide rail; and
a bracket assembly, wherein the bracket assembly comprises at least two bracket main bodies and several reinforcing members; clamping portions are arranged at lower parts of two ends of the bracket main bodies; the reinforcing members are connected to positions, close to the clamping portions, at end portions of the bracket main bodies; sliding chutes are formed between surfaces of the reinforcing members and surfaces of the clamping portions; the sliding chutes allow the annular guide rail to be inserted and slide along the annular guide rail; and a seat, wherein the seat is provided with a locking assembly, and the locking assembly is detachably connected to the bracket assembly.

9. The safety seat according to claim 8, wherein each reinforcing member is provided with a first contact portion and a second contact portion; the second contact portion extends along a surface of the first contact portion towards each clamping portion; the first contact portion is in contact with a lower surface of the annular guide rail; and the second contact portion is in contact with an inner surface of the annular guide rail.

10. The safety seat according to claim 8, wherein the bracket assembly further comprises several locking rods; the locking rods extend along upper parts of the two ends of the bracket main bodies to two sides; and the locking rods are detachably connected to the locking assembly.

11. The safety seat according to claim 10, wherein the bracket assembly further comprises a pressure-bearing member; the pressure-bearing member is connected to the bracket main bodies and/or the locking rods; and a lower surface of the pressure-bearing member is in contact with an upper surface of the annular guide rail.

12. The safety seat according to claim 11, wherein the bracket assembly further comprises a cover plate; and the cover plate is connected to the bracket main bodies, the pressure-bearing member, and the locking rods, and covers the annular guide rail.

13. The safety seat according to claim 12, wherein an accommodating slot is provided on a lower surface of the cover plate; and the bracket main bodies are inserted into the accommodating slot and resist against an inner wall of the accommodating slot.

14. The safety seat according to claim 12, wherein the bracket assembly further comprises a bracket connector; the bracket connector is connected to the various bracket main bodies; and the bracket connector resists against the lower surface of the cover plate.

15. The safety seat according to claim 10, wherein the locking assembly comprises a locking connector and a clamping member; the locking connector is connected to the seat; the clamping member is connected to the locking connector through a rotating shaft and rotates between a locking position and a releasing position; the clamping member is provided with a locking slot; when the clamping member rotates to the locking position, the locking rods are clamped into the locking slot; and when the clamping member rotates to the releasing position, the locking rods are detached from the locking slot.

16. The safety seat according to claim 15, wherein the locking assembly further comprises a limiting shaft and a limiting member; the clamping member is provided with a resisting portion; the limiting member moves relative to the locking connector between a first position and a second position; when the limiting member moves to the first position, the limiting shaft resists against the resisting portion to hinder the rotation of the clamping member; and when the limiting member moves to the second position, the limiting member drives the limiting shaft to be detached from the resisting portion, to allow the clamping member to rotate.

17. The safety seat according to claim 16, wherein the limiting member is provided with a first waist hole arranged horizontally and a second waist hole arranged obliquely; a third waist hole arranged vertically is provided on the locking connector; the rotating shaft is inserted into the first waist hole; and the limiting member is inserted into the second waist hole and the third waist hole.

18. The safety seat according to claim 15, wherein the locking assembly further comprises a first elastic member; two ends of the first elastic member are respectively connected to the clamping member and the seat; and elastic potential energy of the first elastic member enables the clamping member to have a trend to move towards the releasing position.

19. The safety seat according to claim 16, wherein the locking assembly further comprises a second elastic member; two ends of the second elastic member are respectively connected to the limiting member and the seat; and elastic potential energy of the second elastic member enables the limiting member to have a trend to move towards the first position.

20. The safety seat according to claim 16, wherein the locking assembly further comprises a traction member; and the traction member is connected to the limiting member and drives the limiting member to move towards the second position under the action of external force.

\* \* \* \* \*